May 5, 1964  H. T. C. BOUCHER ETAL  3,131,893
FUEL TANK FOR AIRCRAFT
Filed Nov. 9, 1961  4 Sheets-Sheet 2
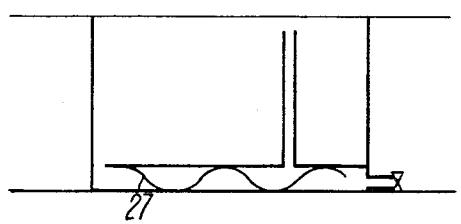
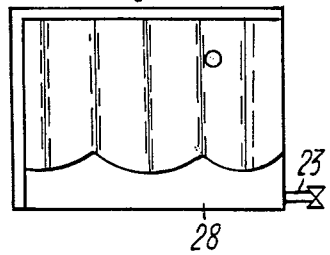
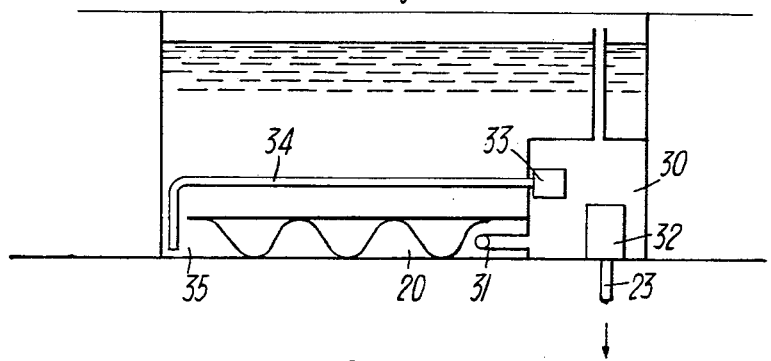
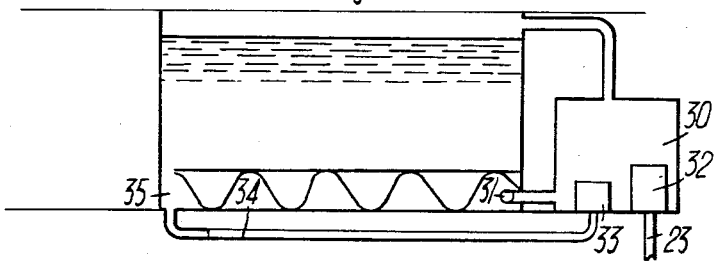
Inventor
Harold Thomas Charlie Boucher
Michael George Wilde
By
Bailey, Stephens & Huettig
Attorneys

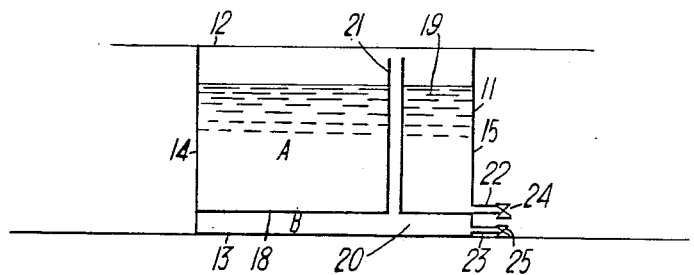
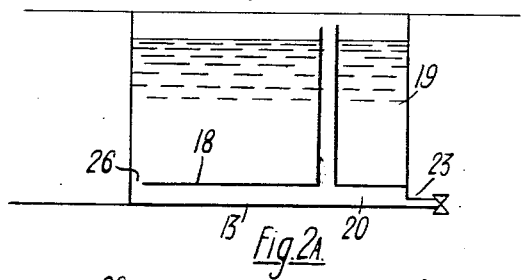
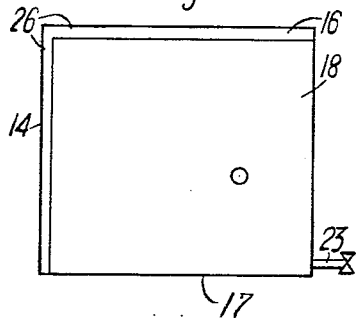

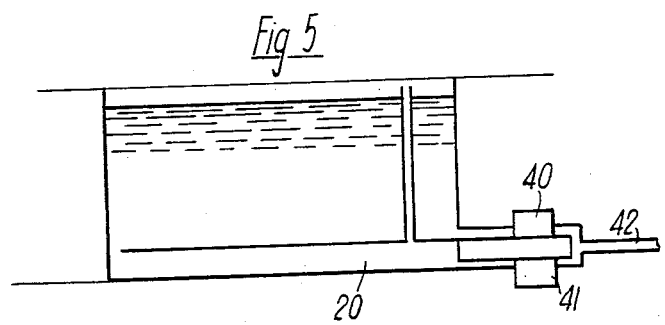
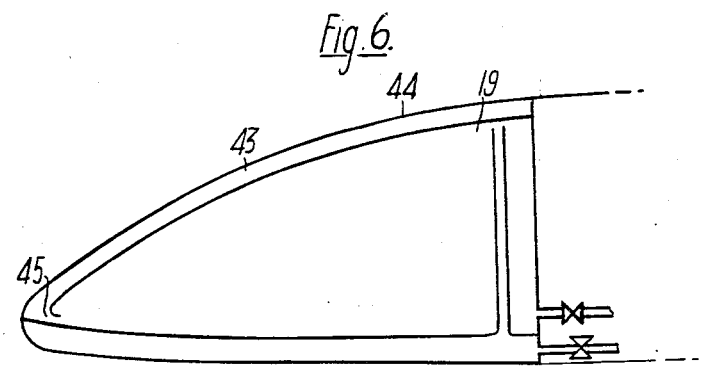

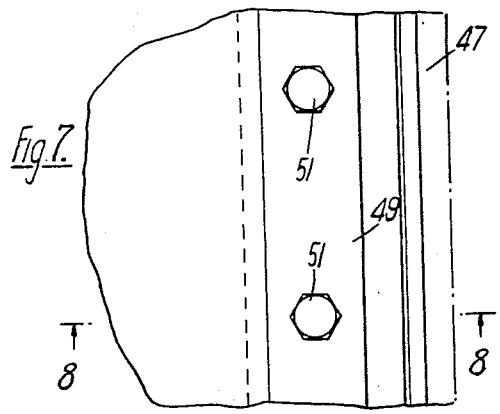
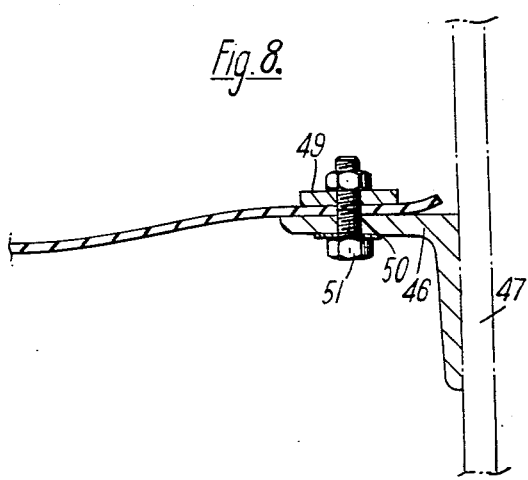

United States Patent Office 3,131,893
Patented May 5, 1964

3,131,893
FUEL TANK FOR AIRCRAFT
Harold Thomas Charlie Boucher and Michael George Wilde, Bristol, England, assignors to Bristol Aircraft Limited
Filed Nov. 9, 1961, Ser. No. 151,758
Claims priority, application Great Britain Nov. 14, 1960
18 Claims. (Cl. 244—135)

This invention is concerned with aircraft tanks having walls which are exposed to heat, for example tanks having walls the outside of which are exposed to the air stream when the aircraft is in flight and are therefore heated when the flight is at supersonic speeds. This invention is particularly concerned with integral tanks, that is to say tanks of which the walls consist wholly or partly of structural members of the aircraft.

It is desirable to limit the rise in temperature which can occur in any substantial volume of fuel during use.

According to the present invention, any wall of a fuel tank which is liable to be heated (for example, by the air stream) is provided with a shroud lying close to the wall inside the tank so as to prevent or retard fuel in contact with the wall from circulating into the main volume of fuel in the tank. The fuel between the shroud and the wall acts as insulation for the main volume of fuel.

The shroud may divide the tank into two completely separate compartments between which no flow can take place in normal circumstances, in which case the subsidiary compartment defined by the shroud and heated wall preferably has an outlet through which the fuel can be led to the engine of the aircraft after the main compartment has been emptied through a separate outlet. As an alternative the shroud may leave a passage between the two compartments, in which case the subsidiary compartment should have an outlet through which fuel is drawn continuously so that the flow is always from the main compartment to the subsidiary compartment.

The difference between the pressures on opposite sides of the shroud during use may be kept small, so the shroud may be made of a light non-metallic material such as a fibre-reinforced plastic or rubber.

Examples of tanks according to the present invention are shown diagrammatically in the accompanying drawings.

In the drawings:

FIG. 1 shows diagrammatically in cross-section a fuel tank embodying the invention.

FIGS. 2, 3, 4, 4A, 5 and 6 are similar views of modified forms.

FIGS. 2A and 3A are plan views of FIGS. 2 and 3 respectively.

FIG. 7 is a fragmentary plan view of a detail and FIG. 8 is a section on the line 8—8 of FIG. 7.

FIGURE 1 shows part of an aircraft wing housing an integral fuel tank 11 of which the top and bottom walls 12 and 13 are formed by the upper and lower skins of the wing. The front and rear walls 14 and 15 are formed by the main wing spars, and the side walls 16 and 17 (not shown in this example) by the wing ribs.

A shroud 18 extends above the bottom wall 13 and is spaced away from it by a small amount, say 1 to 3 inches in a tank 1 to 3 feet in depth. The shroud is sealed around its edges to the walls 14, 15, 16 and 17 so as to divide the tank into two compartments, a main compartment 19 and a subsidiary compartment 20, the only communication between the two compartments being a vent tube 21, which equalises pressure but through which no flow normally takes place, and valves or other devices (not shown) for permitting interflow between the compartments when required, for example when filling or emptying the tanks. Each of these compartments is additionally provided with the customary openings and closures for filling and emptying them; of these only outlet pipes 22 and 23 are shown, these being fitted with stop valves 24 and 25 respectively.

In use the subsidiary compartment 20 is completely filled with fuel, and the main compartment 19 is filled with the amount required for the flight. Fuel for the engines of the aircraft is drawn, as long as there is any available, solely from the main compartment 19. As the speed of the aircraft is increased after take-off, the temperature of the wing surfaces increases so that heat is transferred from the lower skin 13 of the wing to the fuel in the compartment 20. As the compartments 19 and 20 are sealed off from each other, there is no heat transfer by convection from the fuel in compartment 20 to that in compartment 19. The main path for heat flow is by conduction through the shroud 18, and heat flow by this path can be reduced by making the shroud of a material which is a poor conductor of heat, such as a plastic reinforced by glass fibre, or a metal/asbestos/metal sandwich. By this means the temperature of the main volume of fuel, which is in the compartment 19, can be kept to a safe value. Moreover, the temperature of the fuel fed to the engine or engines of the aircraft from the compartment 19 is kept low, which may be desirable.

If all the fuel in the compartment 19 is used up, fuel may be drawn from the compartment 20. Ordinarily however there would be no demand for fuel from the compartment 20 except towards the end of a flight or during landing, when the aircraft speed would have been low enough for a sufficient length of time for the temperature of the fuel in the compartment 20 to have been restored to one which is acceptable for use in cases where the temperature of fuel fed to the engine has to be lower than that obtained in the subsidiary compartment during supersonic flight.

Heat is also transferred from the top surface 12 of the wing into the fuel tank. During take-off and climb the aircraft speed would not ordinarily be such that this heat transfer would cause any substantial rise in temperature. By the time that the aircraft levelled off into supersonic flight, sufficient fuel may have been used up to create a space between the surface of fuel in the compartment 14 and the top of the tank. This space could be pressurised with air or an inert gas, which would provide a measure of insulation.

FIGURE 2 shows a different construction (FIGURE 2A being a plan view) in which there is a passage between the edge of the shroud and the walls 14 and 16 of the tank, these walls being furthest from the outlet 23. The walls 16 and 17 are wing ribs. In use, fuel is drawn from the subsidiary compartment 20 through the outlet 23 and is replenished by fuel flowing in from the main compartment 19 through the gap 26. While flowing through the subsidiary compartment 20 the fuel picks up heat from the hot bottom wall 13, but the temperature of the fuel leaving the outlet 23 may not be as high as that of the fuel in the compartment 20 in FIGURE 1 during supersonic flight, and the fuel may be passed directly to the engines.

The example shown in FIGURE 3 (FIGURE 3A being a plan view) is similar to that shown in FIGURE 2 but includes baffles 27 formed by a corrugated sheet in the subsidiary compartment, so that the fuel flowing into the subsidiary compartment through the gap 26 moves along definite paths to a manifold 28 leading to the outlet 23. The baffles 27 may be specially included for this purpose or may be specially shaped stringers of the wing.

In the example shown in FIGURE 4 there is a reservoir 30 in the tank which is normally filled with fuel from the subsidiary compartment 20 via a non-return valve 31. Fuel is discharged to the engines through an outlet 23 by a booster pump 32. In addition there is in the reservoir 30 a collector pump 33 with a suction pipe 34 which draws from a corner well 35. This well would in practice be the lowest part of the tank.

FIGURE 4A shows a variant of the example shown in FIGURE 4 in which the reservoir and its pumps are positioned outside the tank as this may in some cases be more convenient.

FIGURE 5 shows a variant of the example shown in FIGURE 2, in which pumps 40 and 41 are provided, pump 40 drawing from the main compartment and pump 41 from the subsidiary compartment, the outlets from both pumps being connected to a common discharge pipe 42. The pumps are of a type whose rate of discharge can be varied. By this arrangement, if the temperature of the fuel in the compartment 20 becomes too high to permit of its being passed directly to the engine then it is cooled by the addition of fuel from the main compartment, the relative discharges of the pumps 40 and 41 being adjusted to give the desired rate of fuel flow at a permissible temperature.

Tanks such as those shown in FIGURES 1 to 5 may be located in parts of the aircraft other than the wing.

In the example shown in FIGURE 6 the tank is formed in the leading edge of an aircraft wing, so that the top wall of the tank slopes downwards. The bottom wall is provided with a shroud similar to that shown in FIGURE 1, and in order to prevent the main volume of fuel from being heated by the top wall, which in this case would not be clear of the fuel after a short while, a shroud 44 is included so as to form together with the top wall a compartment 43 which is in communication with the main compartment through a small opening 45.

In general the subsidiary compartment formed by the heated wall and accompanying shroud of a tank according to the present invention may be partly divided into a number of small compartments so as to reduce any possible tendency for convection currents to be set up in the subsidiary compartment.

The walls of a tank according to this invention may be made of metal, and the shroud may be made of a light non-metallic material. For example, the shroud may be made of a multi-layered fabric impregnated with a fuel-resistant rubber. One suitable material is that sold under the trade name "Marlite" by Marston Excelsior Limited. The shroud may be secured in place by cleats in the tank engaging in eyes near the edges of the shroud. In the case of a tank such as those in FIGURES 3 and 4 having baffles formed by a corrugated sheet, the corrugated sheet may also be of rubber-impregnated fabric, in which case it may be secured only to the shroud, being slack so as to droop between the points of attachment to the shroud.

FIGURES 7 and 8 show how a shroud of "Marlite" may be secured in a tank, FIGURE 7 being a fragmentary plan view and FIGURE 8 a section on the line 8—8 in FIGURE 7. A bracket 46 is secured to a wall 47 of the tank and a shroud 48 is clamped against the bracket 46 by a strip 49 and bolts 51 which pass through eyes 50 near the edge of the shroud.

We claim:

1. A fuel tank for an aircraft including a wall which is liable to be heated during use, and means for preventing an excessive rise in temperature of a substantial volume of fuel in the tank, comprising a shroud lying close to the said heated wall but in a slightly spaced relationship with the said wall throughout substantially its entire area, and covering substantially the whole of the said wall so as at least to retard fuel in contact with the said wall from passing into the main volume of fuel in the tank.

2. In a fuel tank according to claim 1 in which the shroud divides the interior of the tank into two compartments, means providing communication between said compartments.

3. A fuel tank according to claim 1 in which the shroud divides the tank into a main compartment and a subsidiary compartment of substantially less volume than the main compartment lying adjacent to said heated wall, said tank including an outlet for fuel from the subsidiary compartment and a separate outlet for fuel from the main compartment of the tank.

4. A fuel tank according to claim 3 in which the heated wall is a bottom wall of the tank, and in which the shroud extends over the entire bottom wall and is joined to the side walls of the tank so as positively to prevent flow of fuel from underneath to above the shroud.

5. A fuel tank for an aircraft including a wall which is liable to be heated during use, and means for preventing an excessive rise in temperature of a substantial volume of fuel in the tank, comprising a shroud lying close to the said heated wall but in a slightly spaced relationship with the said wall throughout substantially its entire area, and covering substantially the whole of the said wall, whereby the shroud divides the tank into a main compartment and a subsidiary compartment of substantially less volume than the main compartment lying adjacent to said heated wall, said tank including an outlet pipe through which fuel can be drawn from the subsidiary compartment, the shroud including means providing access for fuel from the main compartment of the tank to the said outlet through the subsidiary compartment.

6. A fuel tank according to claim 5 in which there are baffles in the subsidiary compartment defining definite paths along which fuel from the main compartment must move to reach the outlet.

7. A fuel tank according to claim 6 in which the baffles are formed by a corrugated sheet substantially filling the subsidiary compartment but providing passage leading to the outlet, said baffles touching both the shroud and the heated wall.

8. A tank according to claim 5 including an outlet from the main compartment, two pumps one connected to each outlet, and a common discharge pipe connected to the delivery sides of both pumps.

9. A tank according to claim 5 including a reservoir which communicates with the outlet pipe from the subsidiary chamber, a booster pump having an inlet connected to the interior of the reservoir and an outlet leading to the engine of the aircraft during use.

10. A tank according to claim 9 in which the outlet pipe from the subsidiary compartment includes a non-return valve preventing flow from the reservoir to the subsidiary compartment.

11. A tank according to claim 9 including a collector pump for delivering to the reservoir fuel from the part of the tank which is lowest during use.

12. A tank according to claim 1 in which the walls of the tank are of metal and the shroud is of a light non-metallic material.

13. A tank according to claim 11 in which the shroud is of rubber-impregnated fabric and has eyes near its edges by which it is secured in the tank.

14. In an aircraft wing structure having a bottom wall, fuel tank in the wing structure, including a bottom wall lying adjacent to the bottom surface of the said wing, and means for preventing an excessive rise in temperature of a substantial volume of fuel in the tank through heat generated in the bottom wall of the tank, the said means comprising a shroud lying above and close to the bottom wall of the tank and covering substantially the entire area of the bottom wall of the tank so as at least to retard fuel in contact with the bottom wall of the tank from passing into the main volume of fuel above the shroud, the shroud being spaced from the bottom wall of the tank over substantially its entire area.

15. A supersonic aircraft wing structure having a bottom surface and a plurality of parallel ribs, a tank of which two adjacent ribs define the side walls and the bottom wall is adjacent to the bottom surface of the wing and is therefore heated by the air stream during supersonic flight, means for preventing an excessive rise in temperature of a substantial volume of fuel in the tank through heat generated in the bottom wall of the tank, the said means comprising a shroud lying above and close to the bottom wall of the tank and covering substantially the entire area of the bottom wall of the tank so as at least to retard fuel in contact with the bottom wall of the tank from passing into the main volume of fuel above the shroud, the shroud being spaced from the bottom wall of the tank over substantially its entire area.

16. In a supersonic aircraft wing structure according to claim 15, the tank being in the leading edge of the wing and the top wall of the tank being also provided with a shroud lying close to it inside the tank, the shroud being arranged to leave an opening at the front through which fuel can flow between the main compartment of the tank and the compartment defined by the top wall and the adjacent shroud.

17. A supersonic aircraft wing structure formed by upper and lower skins connected by a plurality of parallel ribs spaced along the wing structure, including a fuel tank of which the side walls are defined by an adjacent pair of the said ribs, and the top and bottom walls are defined by the said top and bottom skins of the wing, and including means for preventing an excessive rise in temperature of a substantial volume of fuel in the tank through heat generated in the bottom wall of the tank, the said means comprising a shroud lying above and close to the bottom wall and covering substantially the entire area of the bottom wall so as at least to retard fuel in contact with the bottom wall from passing into the main volume of fuel above the shroud.

18. In a supersonic aircraft wing structure, a fuel tank formed by structural metal members of the wing structure, including a metal skin which forms the lower surface of the wing and the bottom wall of the fuel tank, and a non-metallic, non-structural shroud secured in the tank above the said bottom wall of the tank, and covering substantially the entire area of the bottom wall of the tank, and spaced from the bottom wall of the tank over substantially its entire area.

References Cited in the file of this patent
UNITED STATES PATENTS

| | | |
|---|---|---|
| 965,634 | Judevine | July 26, 1910 |
| 1,871,055 | Hasbrouck | Aug. 9, 1932 |
| 2,332,007 | Parker | Oct. 19, 1943 |
| 3,015,461 | Fineblum | Jan. 2, 1962 |

FOREIGN PATENTS

| | | |
|---|---|---|
| 319,918 | Germany | Apr. 7, 1920 |
| 1,095,131 | Germany | Dec. 15, 1960 |
| 555,984 | Great Britain | Sept. 15, 1943 |
| 687,872 | Great Britain | Feb. 25, 1953 |
| 250,264 | Switzerland | June 1, 1948 |
| 538,641 | Canada | Mar. 26, 1957 |